US010543695B2

United States Patent
Hirose et al.

(10) Patent No.: US 10,543,695 B2
(45) Date of Patent: Jan. 28, 2020

(54) PHOTOCURABLE WHITE INK COMPOSITION FOR INKJET PRINTING

(71) Applicant: SAKATA INX CORPORATION, Osaka (JP)

(72) Inventors: Tadashi Hirose, Osaka (JP); Kazuhiro Fuke, Osaka (JP)

(73) Assignee: Sakata Inx Corporation, Osaka (JP)

( * ) Notice: Subject to any disclaimer, the term of this patent is extended or adjusted under 35 U.S.C. 154(b) by 116 days.

(21) Appl. No.: 15/549,374

(22) PCT Filed: Dec. 15, 2015

(86) PCT No.: PCT/JP2015/085005
§ 371 (c)(1),
(2) Date: Aug. 7, 2017

(87) PCT Pub. No.: WO2016/136098
PCT Pub. Date: Sep. 1, 2016

(65) Prior Publication Data
US 2018/0037766 A1 Feb. 8, 2018

(30) Foreign Application Priority Data
Feb. 26, 2015 (JP) .................. 2015-037077

(51) Int. Cl.
B41J 2/21 (2006.01)
B41J 2/01 (2006.01)
B41M 5/00 (2006.01)
C09D 11/101 (2014.01)
C09D 11/30 (2014.01)
C09D 133/08 (2006.01)

(52) U.S. Cl.
CPC .............. B41J 2/2107 (2013.01); B41J 2/01 (2013.01); B41M 5/00 (2013.01); C09D 11/101 (2013.01); C09D 11/30 (2013.01); C09D 133/08 (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| 9,777,172 | B2 * | 10/2017 | Kida ...................... B41J 2/2107 |
| 2007/0078195 | A1 * | 4/2007 | Kobayashi ........... C09D 11/101 522/71 |
| 2008/0090931 | A1 * | 4/2008 | Nagvekar ............... C09D 4/00 522/114 |
| 2009/0208651 | A1 * | 8/2009 | Oyanagi .................. C09D 7/70 427/256 |
| 2010/0203262 | A1 * | 8/2010 | Umebayashi ........ C09D 11/101 427/595 |
| 2011/0251298 | A1 | 10/2011 | Kagose et al. |
| 2012/0133059 | A1 | 5/2012 | Ito et al. |
| 2013/0065029 | A1 * | 3/2013 | Fujii .................... C09D 11/101 428/195.1 |
| 2013/0321520 | A1 | 12/2013 | Ito et al. |
| 2015/0017398 | A1 | 1/2015 | Saito et al. |
| 2015/0203695 | A1 * | 7/2015 | Mizutani .................... B41J 2/01 428/195.1 |

FOREIGN PATENT DOCUMENTS

| EP | 2192163 A1 | 6/2010 |
| EP | 2233538 A1 | 9/2010 |

(Continued)

OTHER PUBLICATIONS

International Search Report mailed by Japan Patent Office dated Mar. 1, 2016 in the corresponding PCT Application No. PCT/JP2015/085005.
Extended European Search Report dated Aug. 1, 2018 in European Application No. 15883388.9, in 6 pgs.
International Preliminary Report on Patentability and Written Opinion of the International Searching Authority in PCT Application No. PCT/JP2015/085005, dated Aug. 29, 2017.
Office Action issued in Japanese patent application No. 2015-037077 dated Jan. 31, 2019.

Primary Examiner — Manish S Shah
(74) Attorney, Agent, or Firm — Knobbe, Martens, Olson & Bear, LLP

(57) ABSTRACT

A photocurable white ink composition for inkjet printing contains: a photopolymerizable compound that contains: virtually no vinyl formamide; 0.1 to 20 percent by mass of a monofunctional monomer containing an ether group relative to the total mass of the photopolymerizable component; 35 to 70 percent by mass of a monofunctional monomer containing a cyclic structure relative to the total mass of the photopolymerizable component; 5 to 40 percent by mass of a multifunctional monomer relative to the total mass of the photopolymerizable component; an acyl phosphine oxide photopolymerization initiator by 3 to 20 percent by mass relative to the total mass of the photopolymerizable component; and titanium dioxide; wherein, the viscosity of said photocurable white ink composition for inkjet printing is 100 mPa·s or less at 25° C.

2 Claims, No Drawings

(56) References Cited

FOREIGN PATENT DOCUMENTS

| | | |
|---|---|---|
| EP | 2568020 A1 | 3/2013 |
| EP | 2803503 A1 | 11/2014 |
| JP | 2010-116460 A | 5/2010 |
| JP | 2011-122063 | 6/2011 |
| JP | 2011-137069 | 7/2011 |
| JP | 2012-092291 A | 5/2012 |
| JP | 2012-116928 A | 6/2012 |
| JP | 2012-116934 A | 6/2012 |
| JP | 2012-140491 A | 7/2012 |
| JP | 2012-158638 A | 8/2012 |
| JP | 2013-142151 | 7/2013 |
| JP | 2015-168723 A | 9/2015 |
| WO | WO 2010/143738 A1 | 12/2010 |

* cited by examiner

PHOTOCURABLE WHITE INK COMPOSITION FOR INKJET PRINTING

This application is the U.S. National Phase under 35 U.S.C. § 371 of International Application PCT/JP2015/085005, filed Dec. 15, 2015, which claims priority to Japanese Patent Application No. 2015-037077, filed Feb. 26, 2015. The International Application was published under PCT Article 21(2) in a language other than English.

TECHNICAL FIELD

The present invention relates to a photocurable white ink composition for inkjet printing, as well as an inkjet printing method. More specifically, the present invention relates to a photocurable white ink composition for inkjet printing that exhibits good properties including curability (curability in thin film form) under ultraviolet light generated by a light source using light-emitting diodes (LEDs), adhesion to polyvinyl chloride sheets, etc., solvent resistance, scratch resistance, discharge stability, and storage stability.

BACKGROUND ART

Lately, there have been a growing number of opportunities where the inkjet recording method is utilized for the purpose of producing large outdoor advertisements, etc., that require a large image area. Base materials used for these large outdoor advertisements include polyvinyl chloride sheets having strength to withstand outdoor use, such as sheets made solely of polyvinyl chloride resin, as well as tarpaulin and other sheets made of composite materials. As inkjet printing inks used for printing on these polyvinyl chloride sheets, photocurable ink compositions for inkjet printing that do not use volatile components are proposed.

For the aforementioned outdoor advertisements, etc., to withstand weather, not only must their base material be tough, but the ink composition must also be able to form a tough film. However, photocurable materials that can form a tough film tend to have lower adhesion to the base materials because the films are generally very hard. For an ink composition of the aforementioned type, therefore, sometimes a method is adopted whereby a component that dissolves the base material is blended into the ink so as to improve its adhesion to the base material. For example, an active energy ray-curable inkjet ink that contains, at a specific ratio, a compound containing ethylene double bonds that does not dissolve polyvinyl chloride, and a compound containing ethylene double bonds (N-vinyl caprolactam) that dissolves polyvinyl chloride is proposed for use on a polyvinyl chloride sheet (refer to Patent Literature 1).

However, use of such inkjet ink to manufacture a printed matter presents a problem in that the printed matter cockles easily (cockling refers to deflection of the base material), although the ink adheres to a polyvinyl chloride sheet favorably.

In addition, when images are cured using a metal halide lamp or other conventional, generally used high-energy light source, problems also occur such as generation of ozone, need to increase the size of the irradiating equipment, shorter service life of the lamp, etc. Accordingly, low-energy light-emitting diode lamps (LED lamps) are used as light sources in recent years. This gives rise to such requirements as curability under LED lamps, printing performance (adhesion, improvement of cockling, etc.) and safety (flash point, irritability, etc.), and photocurable ink compositions for inkjet printing that can meet these requirements are proposed.

Among such photocurable ink composition for inkjet printing that have been proposed are, for example: a photocurable ink composition for inkjet printing that contains pigment, benzyl acrylate, N-vinyl caprolactam, acrylated amine compound having two photopolymerizable function groups and two amino groups in its molecule, and sensitizer (refer to Patent Literature 2); and a photocurable ink composition for inkjet printing that contains pigment, specified amount of a compound having (meth)acrylate and vinyl ether groups in its molecule, and specified amount of vinyl caprolactam (refer to Patent Literature 3).

BACKGROUND ART LITERATURE

Patent Literature

Patent Literature 1: Japanese Patent Laid-open No. 2012-158638
Patent Literature 2: International Patent Laid-open No. 2010/143738
Patent Literature 3: Japanese Patent Laid-open No. 2012-116934

SUMMARY OF THE INVENTION

Problems to be Solved by the Invention

Accordingly, an object of the present invention is to provide a photocurable white ink composition for inkjet printing that exhibits good properties including curability in thin film form under ultraviolet light, especially ultraviolet light generated by a light source using light-emitting diodes (LEDs), adhesion to polyvinyl chloride sheet, etc., solvent resistance, scratch resistance, discharge stability, and storage stability.

Means for Solving the Problems

After conducting a research in earnest to achieve the aforementioned object, the inventors of the present invention found that all of the details of the aforementioned object would be achieved using a photopolymerizable component of photocurable white ink composition for inkjet printing which contains virtually no vinyl formamide but contains specified amounts, relative to the total mass of the photopolymerizable component, of a monofunctional monomer containing an ether group and a monofunctional monomer containing a cyclic structure, and a specified amount of a multifunctional monomer; and photopolymerization initiator thereof which contains an acyl phosphine oxide compound along with titanium dioxide; and consequently completed the present invention.

In other words, the present invention provides (1) a photocurable white ink composition for inkjet printing that contains: a photopolymerizable compound that contains: virtually no vinyl formamide; 0.1 to 20 percent by mass of a monofunctional monomer containing an ether group relative to the total mass of the photopolymerizable component; 35 to 70 percent by mass of a monofunctional monomer containing a cyclic structure relative to the total mass of the photopolymerizable component; 5 to 40 percent by mass of a multifunctional monomer relative to the total mass of the photopolymerizable component; and an acyl phosphine oxide photopolymerization initiator by 3 to 20 percent by mass relative to the total mass of the photopolymerizable component; and titanium dioxide; wherein, the viscosity of said photocurable white ink composition for inkjet printing is 100 mPa·s or less at 25° C.

In addition, the present invention provides (2) a photocurable white ink composition for inkjet printing according to (1) above, characterized in that: the monofunctional monomer containing an ether group is at least one type of compound selected from tetrahydrofurfuryl acrylate, phenoxy ethyl acrylate, ethylene oxide modified phenol acrylate, ethyl carbitol acrylate, and 2-methoxy ethyl acrylate; and the monofunctional monomer containing a cyclic structure is at least one type of compound selected from benzyl acrylate, cyclohexyl acrylate, phenoxy ethyl acrylate, ethylene oxide modified phenol acrylate, acryloyl morpholine, isobornyl acrylate, tetrahydrofurfuryl acrylate, and 4-tert-butylcyclohexyl acrylate.

In addition, the present invention provides (3) a photocurable white ink composition for inkjet printing according to (1) or (2) above, characterized in that: the multifunctional monomer is at least one type of compound selected from 1,6-hexane diol di(meth)acrylate, propoxylated neopentyl glycol di(meth)acrylate, dipropylene glycol di(meth)acrylate, tripropylene glycol di(meth)acrylate, trimethylol propane triacrylate, ethoxylated trimethylol propane triacrylate, and propoxylated trimethylol propane triacrylate.

In addition, the present invention provides (4) an inkjet printing method using a photocurable white ink composition for inkjet printing according to any one of (1) to (3) above, wherein said inkjet printing method is characterized in that: the photocurable white ink composition for inkjet printing is deposited on a target recording medium; and ultraviolet light generated by a light source using light-emitting diodes and having a luminescence peak wavelength in a range of 350 to 420 nm, is irradiated onto the deposited photocurable white ink composition for inkjet printing.

Effects of the Invention

The present invention can demonstrate remarkable effects in the form of excellent properties including curability in thin film form under ultraviolet light, especially ultraviolet light generated by a light source using light-emitting diodes (LEDs), adhesion to polyvinyl chloride sheets, etc., solvent resistance, scratch resistance, discharge stability, and storage stability, by using a photocurable white ink composition for inkjet printing made with a specific composition.

MODE FOR CARRYING OUT THE INVENTION

The photocurable white ink composition for inkjet printing proposed by the present invention (hereinafter referred to as "white ink composition proposed by the present invention") is explained in detail below.

It should be noted that, under the present invention, ultraviolet light generated by a light source using light-emitting diodes (LEDs), as mentioned below, is defined as "light irradiated by light-emitting diodes that generate ultraviolet light whose luminescence peak wavelength is in a range of 350 to 420 nm."

The white ink composition proposed by the present invention contains at least a photopolymerizable component, titanium dioxide, and an acyl phosphine oxide photopolymerization initiator.

<Photopolymerizable Component>

With the white ink composition proposed by the present invention, the photopolymerizable component contains virtually no vinyl formamide but contains three components including a monofunctional monomer containing an ether group, a monofunctional monomer containing a cyclic structure, and a multifunctional monomer.

Here, one type of compound may be contained in multiple components of these three components, or it may be contained in any one component.

Because the photopolymerizable component contains virtually no vinyl formamide, the photocurable white ink composition for inkjet printing proposed by the present invention, which is manufactured through a pigment dispersion step, achieves good discharge stability and storage stability. Also, because the photopolymerizable component contains specified amounts of a monofunctional monomer containing an ether group, a monofunctional monomer containing a cyclic structure, and a multifunctional monomer, a viscosity of 100 mPa·s or less at 25° C. is achieved, along with excellent photocurability particularly curability (curability in thin film form) under ultraviolet light generated by a light source using light-emitting diodes (LEDs), as well as good adhesion to polyvinyl chloride sheets, etc., and good discharge stability.

It should be noted that, under the present invention, "contains virtually no vinyl formamide" means that the concentration of vinyl formamide in the photocurable white ink composition for inkjet printing proposed by the present invention is 2 percent by mass or less, 1 percent by mass or less, even lower such as 0.5 percent by mass or less, or 0 percent by mass at the lowest, relative to the total mass of the photopolymerizable component.

The monofunctional monomer containing an ether group may be (meth)acryloyl morpholine, 2-methoxy ethyl (meth)acrylate, ethoxy ethyl (meth)acrylate, ethyl carbitol acrylate, tetrahydrofurfuryl (meth)acrylate, phenoxy ethyl (meth)acrylate, ethylene oxide modified phenol (meth)acrylate, 3-methoxy butyl (meth)acrylate, ethoxy ethoxy ethyl (meth)acrylate, butoxy ethyl (meth)acrylate, ethoxy diethylene glycol (meth)acrylate, methoxy dipropylene glycol (meth)acrylate, or any of the foregoing that has been modified by ethylene oxide or propylene oxide, or the like. Any one type, or two or more types if necessary, of monofunctional monomer(s) containing ether group(s) may be selected from the foregoing and used.

The content of the monofunctional monomer containing an ether group is 0.1 to 20 percent by mass, or preferably 5 to 15 percent by mass, relative to the total mass of the photopolymerizable component. If the content of the monofunctional monomer containing an ether group is less than 0.1 percent by mass, the curability in thin film form of printed matter obtained using the photocurable white ink composition for inkjet printing proposed by the present invention drops; if the content exceeds 20 percent by mass, on the other hand, the solvent resistance, against isopropyl alcohol or other solvents, of printed matter obtained using the photocurable white ink composition for inkjet printing proposed by the present invention tends to drop.

Examples of the monofunctional monomer containing a cyclic structure include tetrahydrofurfuryl (meth)acrylate, phenoxy ethyl (meth)acrylate, and ethylene oxide modified phenol (meth)acrylate that have been cited as specific examples of the monofunctional monomer containing an ether group; and benzyl (meth)acrylate, 4-tert-butyl cyclohexyl (meth)acrylate, cyclohexyl (meth)acrylate, isobornyl (meth)acrylate, etc., that are specific examples other than monofunctional monomers containing ether groups. Any one type, or two or more types if necessary, of monofunctional monomer(s) containing a cyclic structure may be selected from the foregoing and used.

Under the present invention, the content of the monofunctional monomer containing a cyclic structure is 35 to 70 percent by mass, or preferably 35 to 65 percent by mass, relative to the total mass of the photopolymerizable component. If the content is less than 35 percent by mass relative to the total mass of the photopolymerizable component, the adhesion to polyvinyl chloride sheets of the photocurable white ink composition for inkjet printing proposed by the present invention tends to drop; if the content exceeds 70 percent by mass, on the other hand, the scratch resistance and solvent resistance of printed matter obtained using the photocurable white ink composition for inkjet printing proposed by the present invention tend to drop.

Examples of the multifunctional monomer include 1,6-hexane diol di(meth)acrylate, propoxylated neopentyl glycol di(meth)acrylate, diethylene glycol diacrylate, dipropylene glycol di(meth)acrylate, tripropylene glycol di(meth)acrylate, trimethylol propane triacrylate, trimethylol propane-alkylene oxide adduct triacrylate, trimethylol propane triacrylate, ethoxylated trimethylol propane triacrylate, propoxylated trimethylol propane triacrylate, diethylene glycol divinyl ether, glyceryl ethoxy triacrylate, glyceryl propoxy triacrylate, pentaerythritol tetra-acrylate, dipentaerythritol pentacrylate, dipentaerythritol hexa-acrylate, ditrimethylol propane tetra-acrylate, various urethane acrylates, various polyester acrylates, etc.

Under the present invention, the content of the multifunctional monomer is 5 to 40 percent by mass, or preferably 5 to 35 percent by mass, relative to the total mass of the photopolymerizable component. If the content of the multifunctional monomer is less than 5 percent by mass, the solvent resistance, against isopropyl alcohol or other solvents, of printed matter obtained using the photocurable white ink composition for inkjet printing proposed by the present invention tends to drop. If the content exceeds 40 percent by mass, on the other hand, the adhesion to polyvinyl chloride sheet of printed matter obtained using the photocurable white ink composition for inkjet printing proposed by the present invention tends to drop.

It should be noted that if compounds corresponding to two or more types of the various monomers among monofunctional monomers containing ether groups, monofunctional monomers containing a cyclic structure, multifunctional monomers containing amino groups, and monomers containing a trimethylol propane skeleton as mentioned above are used, such compounds are treated as respective monomers of the various monomers.

Furthermore, as the photopolymerizable component constituting the photocurable white ink composition for inkjet printing proposed by the present invention, any photopolymerizable component other than the specific monomers and photopolymerizable component mentioned above may be combined at a content that does not cause the performance of the present invention to drop. For such other photopolymerizable component, monomers, prepolymers, oligomers, etc., may be used without any specific limitation so long as they are compounds containing ethylene double bonds.

Examples of the other photopolymerizable component include low-viscosity photopolymerizable components such as isobutyl acrylate, isooctyl acrylate, isodecyl acrylate, etc., as well as urethane (meth)acrylate, epoxy (meth)acrylate, polyester (meth)acrylate, 2-hydroxy ethyl (meth)acrylate, 2-hydroxy propyl (meth)acrylate, 4-hydroxy butyl (meth) acrylate, t-butyl (meth)acrylate, and the like. Any one type, or two or more types if necessary, of other photopolymerizable components may be selected from the foregoing and used.

<Acyl Phosphine Oxide Photopolymerization Initiator>

The photocurable white ink composition for inkjet printing proposed by the present invention contains an acyl phosphine oxide photopolymerization initiator.

For the acyl phosphine oxide photopolymerization initiator, an acyl phosphine oxide photopolymerization initiator (compound) that manifests initiator function under light of 450 to 300 nm in wavelength is used. It should be noted that "manifests initiator function under light of 450 to 300 nm in wavelength" means having light absorption characteristics over the entire wavelength range of 450 to 300 nm. By using such acyl phosphine oxide photopolymerization initiator, LED curability can be further imparted to the photocurable white ink composition for inkjet printing proposed by the present invention.

Specific examples include 2,4,6-trimethylbenzoyl-diphenyl-phosphine oxide (product name: TPO, manufactured by Lambson), bis(2,4,6-trimethylbenzoyl)-phenyl phosphine oxide (product name: IRGACURE819, manufactured by BASF), and the like.

The content of any such acyl phosphine oxide photopolymerization initiator is in a range of 3 to 20 percent by mass, or more preferably in a range of 10 to 20 percent by mass, relative to the total mass of the photopolymerizable component. If the content of the acyl phosphine oxide photopolymerization initiator is less than 3 percent by mass, curability may not be sufficient. If the content exceeds 20 percent by mass, on the other hand, the storage stability of the photocurable white ink composition for inkjet printing proposed by the present invention drops.

<Sensitizer>

The photocurable white ink composition for inkjet printing proposed by the present invention may also use, in combination, a photosensitizer (compound) that has light absorption characteristics under ultraviolet light in a range of primarily 400 nm or more in wavelength and manifests curing reaction sensitization function under light of wavelengths in this range in order to promote curability under ultraviolet light generated by a light source using light-emitting diodes (LEDs).

It should be noted that "manifests sensitization function under light of 400 nm or more in wavelength" above means having light absorption characteristics in a wavelength range of 400 nm or more. By using such sensitizer, the LED curability of the photocurable white ink composition for inkjet printing proposed by the present invention can be promoted.

Examples of the photosensitizer include an anthracene sensitizer, a thioxanthone sensitizer, etc., and preferably a thioxanthone sensitizer. Any of the foregoing may be used alone, or two or more types may be used in combination.

Specific examples include 9,10-dibutoxy anthracene, 9,10-diethoxy anthracene, 9,10-dipropoxy anthracene, 9,10-bis (2-ethylhexyloxy) anthracene, and other anthracene sensitizers, as well as 2,4-diethyl thioxanthone, 2-isopropyl thioxanthone, 4-isopropyl thioxanthone, and other thioxanthone sensitizers. Representative examples of commercial products include DBA and DEA (manufactured by Kawasaki Kasei Chemicals) for anthracene derivatives, DETX and ITX (manufactured by Lambson) for thioxanthone derivatives, etc.

The content of the sensitizer is in a range of 0 to 4 percent by mass relative to the total mass of the photopolymerizable component. If the content exceeds 4 percent by mass, the photocurable white ink composition for inkjet printing proposed by the present invention may turn yellow, which is not desirable.

<Titanium Dioxide>

The photocurable white ink composition for inkjet printing proposed by the present invention contains titanium dioxide. For the titanium dioxide, any of the various titanium oxides of rutile type, anatase type, and other types that are conventionally used for inkjet ink, may be used.

Under the present invention, preferably the content of the titanium dioxide in the photocurable white ink composition for inkjet printing is 1 to 20 percent by mass relative to the total amount of the photocurable white ink composition for inkjet printing. If the content of the titanium oxide is less than 1 percent by mass, the image quality of the obtained printed matter tends to drop. If the content exceeds 20 percent by mass, on the other hand, the viscosity characteristics of the photocurable white ink composition for inkjet printing tends to be negatively affected.

<Pigment Dispersant>

Also, the photocurable white ink composition for inkjet printing proposed by the present invention may contain a pigment dispersant, if necessary.

The pigment dispersant is used to improve the pigment dispersibility and the preservation stability of the white ink composition proposed by the present invention, and any conventional pigment dispersant may be used without any specific limitation; of conventional pigment dispersants, however, preferably polymer dispersants are used. These pigment dispersants include carbodiimide dispersants, polyester amine dispersants, aliphatic amine dispersants, modified polyacrylate dispersants, modified polyurethane dispersants, multi-chain polymer non-ion dispersants, polymer ion activators, etc. Any of these pigment dispersants may be used alone, or two or more types may be used in combination.

Preferably the content of the pigment dispersant is 1 to 200 parts by mass when the total amount of pigment used represents 100 parts by mass. If the content of the pigment dispersant is less than 1 part by mass, the pigment dispersibility, and the storage stability of the white ink composition proposed by the present invention, may drop. On the other hand, the content of the pigment dispersant may be more than 200 parts by mass, but this may not result in any difference in effects. A more preferable lower limit of the content of the pigment dispersant is 5 parts by mass, while a more preferable upper limit is 60 parts by mass.

<Surface Active Agent>

Preferably the photocurable white ink composition for inkjet printing proposed by the present invention contains, as a surface-active agent, any silicone surface-active agent or other surface-active agent conventionally used in photocurable ink compositions for inkjet printing proposed, according to the inkjet head used, in order to improve the discharge stability.

Specific examples of silicone surface-active agents include polyether modified silicone oil, polyester modified polydimethyl siloxane, polyester modified methyl alkyl polysiloxane, etc. Any of the foregoing may be used alone, or two or more types may be used in combination.

The content of the surface-active agent in the white ink composition proposed by the present invention is 0.005 to 1.0 percent by mass. If the content is less than 0.005 percent by mass, the surface tension of the white ink composition proposed by the present invention increases, and the discharge stability from the inkjet head drops. If the content exceeds 1.0 percent by mass, on the other hand, bubbles in the white ink composition proposed by the present invention increase, and the discharge stability drops.

<Additives>

Various types of additives may be added to the photocurable white ink composition for inkjet printing proposed by the present invention in order to manifest various functionalities, as necessary. Specific examples include photostabilizers, surface treatment agents, anti-oxidants, anti-aging agents, cross-linking promoters, polymerization inhibitors, plasticizers, preservatives, pH adjustment agents, defoaming agents, humectants, etc.

Preferably the photocurable white ink composition for inkjet printing proposed by the present invention that is obtained using the materials above has a flash point of 70° C. or above as measured with a Setaflash closed-cup flash point tester conforming to JIS K2265. Having such flash point, the white ink composition proposed by the present invention conforms to Flammable Liquid Category 4 under GHS and, as such, presents excellent safety backed by low flammability, etc.

Also, the photocurable white ink composition for inkjet printing proposed by the present invention has a viscosity of 100 mPa·s or lower at 25° C. Furthermore, the photocurable white ink composition for inkjet printing can be designed with a specific viscosity suitable for each inkjet device.

It should be noted that, in this Specification, "viscosity" represents the viscosity measured with a type E viscometer (product name: RE100L Viscometer, manufactured by Toki Sangyo) under the condition of 25° C. and 20 rpm.

As it contains the aforementioned specific photopolymerizable component and acyl phosphine oxide photopolymerization initiator by specified amounts, the photocurable white ink composition for inkjet printing proposed by the present invention offers excellent curability under ultraviolet light, especially ultraviolet light generated by a light source using light-emitting diodes (LEDs), good adhesion to flooring materials and base materials such as polyvinyl chloride and polycarbonate, good scratch resistance, excellent discharge stability and storage stability, and excellent overall safety backed by a high flash point, low skin irritability, and low odor.

The method for preparing the white ink composition proposed by the present invention is not limited in any way, and it may be prepared by adding all of the aforementioned materials and mixing them together in a bead mill, three-roll mill, etc.

It should be noted that the white ink composition proposed by the present invention may be prepared by mixing the titanium dioxide, pigment dispersant, and photopolymerizable component to obtain a concentrated emulsified ink (conc. base ink) beforehand and then adding to this conc. base ink the photopolymerizable component, acyl phosphine oxide photopolymerization initiator, and surface-active agent and other additives as necessary, so as to achieve a desired photocurable white ink composition for inkjet printing.

Preferably the base material on which the white ink composition proposed by the present invention is printed is flooring material, vinyl chloride, polycarbonate, etc.; however, any base material conventionally printed with a photocurable white ink composition for inkjet printing (such as paper, plastic film, capsule, gel, metal foil, glass, or cloth) may be printed on without problem.

Specific methods to print and cure the white ink composition proposed by the present invention include a method whereby the white ink composition proposed by the present invention is discharged onto the base material using an inkjet head, after which the film of the white ink composition that has landed on the base material is exposed to and cured under light.

For example, the white ink composition proposed by the present invention may be discharged onto the base material (to print images) by supplying it to a printer head for an inkjet recording printer that can handle low-viscosity inks and then discharging the white ink composition from the printer head so as to form a film of 1 to 60 μm in thickness on the base material, for example. Also, the film of the white ink composition proposed by the present invention may be exposed to and cured under light (to harden the images) by irradiating light onto the film of the white ink composition that has been applied onto the base material as images.

For the inkjet recording printer device used for printing the white ink composition proposed by the present invention, any conventionally used inkjet recording printer device may be used. It should be noted that, if a continuous-type inkjet recording printer device is used, a conductivity-imparting agent is further added to the white ink composition proposed by the present invention to adjust its electrical conductivity.

The light source for curing the aforementioned film may be ultraviolet (UV) light, UV light-emitting diodes (LEDs), electron beams, visible light, etc. From an environmental viewpoint, however, preferably light-emitting diodes (LEDs) that generate ultraviolet light whose luminescence peak wavelength is in a range of 350 to 420 nm are used.

EXAMPLES

Examples 1 to 3 and Comparative Examples 1 to 8

Preparation of Photocurable White Ink Composition for Inkjet Printing

The present invention is explained in greater detail below using examples; however, the present invention is not limited to these examples. It should be noted that "percent" means "percent by mass," and "part" means "part by mass" unless otherwise specified.

The materials used in the following examples and comparative examples are listed below.
<Pigment Dispersant>
Solsperse 56000 (manufactured by Lubrizol)
<Photopolymerizable Components>
Viscoat #160: Benzyl acrylate (manufactured by Osaka Organic Chemical Industry)
Beamset 770: Vinyl formamide (manufactured by Arakawa Chemical Industries)
SR285: Tetrahydrofurfuryl acrylate (manufactured by Sartomer)
SR454: Trimethylol propane ethylene oxide adduct triacrylate (manufactured by Sartomer)
SR440: Isodecyl acrylate (manufactured by Sartomer)
SR508: Dipropylene glycol diacrylate (manufactured by Sartomer)
<Acyl Phosphine Oxide Photopolymerization Initiator>
TPO: 2,4,6-trimethylbenzoyl-diphenyl-phosphine oxide (manufactured by Lambson)
<Non-Acyl Phosphine Oxide Photopolymerization Initiator>
IRGACURE184: 1-hydroxy-cyclohexyl-phenyl-ketone (manufactured by BASF)
<Sensitizer>
DETX: 2,4-diethyl thioxanthone (manufactured by Lambson)

<Additives>
UV-22: Irgastab UV 22: Mixture of 2,6-bis(1,1-dimethylethyl)-4-(phenylmethylene)-2,5-cyclohexazine-1-one and glycerol triacrylate (mass ratio 20:80) (manufactured by BASF)
BYK-315: Silicone additive (manufactured by BYK Chemie)
<White Ink Compositions>
A mixture of titanium dioxide, pigment dispersant (Solsperse 56000), and polymerizable component (Viscoat #160), with the respective ingredients blended at ratios (mass ratios) of 40/4/56, was dispersed using an Eiger mill (zirconium beads of 0.5 mm in diameter were used as media), to obtain a white conc. base.

The respective components were blended into the obtained white conc. base according to the blending compositions (percent by mass) in Table 1 and mixed under agitation, to obtain the photocurable white ink compositions for inkjet printing in Examples 1 to 3 and Comparative Examples 1 to 8.

[Viscosity Measurement of Ink Compositions]

The photocurable white ink compositions for inkjet printing obtained in Examples 1 to 3 and Comparative Examples 1 to 8 were measured for viscosity using a type E viscometer (product name: RE100L Viscometer, manufactured by Toki Sangyo) under the condition of 25° C. in temperature and 20 rpm in rotor speed. The results are shown in Table 1.

[Performance Evaluation of Ink Compositions]

(Standard Film Thickness)

The photocurable white ink compositions for inkjet printing obtained in Examples 1 to 3 and Comparative Examples 1 to 8 were applied on PVC80 (manufactured by Lintec) using a #4 bar-coater. Next, they were cured using a UV-LED lamp manufactured by Phoseon Technology.

Curability under the UV-LED lamp, adhesion, solvent resistance, and scratch resistance, were evaluated according to the methods below. The results are shown in Table 1.

(LED Curability)

LED curability was evaluated based on the number of irradiations needed to eliminate surface tack, by irradiating with a UV-LED lamp manufactured by Phoseon Technology under the irradiating condition of 1 second of irradiation at a time (for a cumulative UV light of 60 mJ/cm$^2$ per second), with the distance between the lamp and the ink application surface adjusted to 2 cm.

(Adhesion)

The cured film of each white ink composition that had been cured until there was no surface tack, was cut crosswise using a cutting knife, after which a piece of clear adhesive tape was adhered over the cut area and then peeled, to evaluate the degree of separation of the cured film according to the criteria below:

◯: The cured film did not separate.

Δ: The cured film separated, but the separated area was less than 20%.

×: The separated area of the cured film was 20% or more.

(Solvent Resistance)

Using a Gakushin-type color fastness tester (manufactured by Daiei Kagaku Seiki), the cured film of the white ink composition was rubbed 20 times under a load of 500 g with a bleached cotton cloth moistened with isopropyl alcohol, and to determine the level of dissolution of the cured film, the soiling of the bleached cotton cloth and the condition of the rubbed cured film surface were visually observed and evaluated according to the criteria below:

○: There was no visible soiling of the bleached cotton cloth or loss or wear of the cured film.

Δ: The bleached cotton cloth became soiled, but no loss or wear of the cured film was observed.

x: The bleached cotton cloth became soiled, and the cured film also showed loss and wear.

(Scratch Resistance)

Using a Gakushin-type color fastness tester (manufactured by Daiei Kagaku Seiki), the film was rubbed 200 times under a load of 500 g with a bleached cotton cloth, and the level of stripping-off of the film was visually observed and evaluated according to the criteria below:

○: The film was not stripped off.

Δ: The film had scratches on the surface.

x: The film was stripped off, and the base material became visible.

(Discharge Stability)

An inkjet recording device equipped with an inkjet nozzle for low-viscosity inks and the white ink compositions obtained in Examples 1 to 3 and Comparative Examples 1 to 8 were let stand for 24 hours in an ambient temperature of 25° C., so that the temperature of the inkjet recording device and that of each white ink composition became 25° C. Thereafter, each white ink composition was printed continuously on PVC80 (manufactured by Lintec) in an ambient temperature of 25° C., to evaluate discharge stability according to the criteria below:

○: Printing was not disturbed, and the ink was discharged stably.

x: Printing was disturbed, or the ink was not discharged stably.

(Storage Stability)

The white ink compositions obtained in Examples 1 to 3 and Comparative Examples 1 to 8 were each taken into a glass vial, and each glass vial was sealed and stored for seven days at 40° C., after which the condition was evaluated according to the evaluation criteria below:

○: There was no thickening or sediment.

Δ: There was slight thickening or sediment that disappeared when the vial was shaken lightly.

x: There was a lot of thickening or sediment that did not disappear even when the vial was shaken strongly.

(LED Curability in Thin Film Form)

The photocurable white ink compositions for inkjet printing obtained in Examples 1 to 3 and Comparative Examples 1 to 8 were applied on PVC 80 (manufactured by Lintec) using a #3 bar-coater. Next, the white ink compositions were cured using a UV-LED lamp manufactured by Phoseon Technology.

They were evaluated for curability under the UV-LED lamp according to the method below. The results are shown in Table 1.

(Curability Under UV-LED Lamp)

LED curability was evaluated based on the number of irradiations needed to eliminate surface tack, by irradiating with a UV-LED lamp manufactured by Phoseon Technology under the irradiating condition of 1 second of irradiation at a time (for a cumulative UV light of 60 mJ/cm$^2$ per second), with the distance between the lamp and the ink application surface adjusted to 2 cm.

TABLE 1

|  | Examples | | | Comparative Examples | | | | | | | |
|---|---|---|---|---|---|---|---|---|---|---|---|
|  | 1 | 2 | 3 | 1 | 2 | 3 | 4 | 5 | 6 | 7 | 8 |
| White conc. Base | 32.0 | 32.0 | 32.0 | 32.0 | 320 | 32.0 | 32.0 | 32.0 | 32.0 | 32.0 | 32.0 |
| SR285 | 12.0 | 12.0 | 12.0 | 12.0 | 12.0 |  | 20.0 | 12.0 | 12.0 | 12.0 | 12.0 |
| Viscoat #160 | 21.9 | 31.9 | 31.9 | 11.9 | 1.9 | 33.9 | 13.9 | 37.5 | 21.9 | 21.9 | 15.9 |
| SR508 | 20.0 | 10.0 |  | 20.0 | 20.0 | 20.0 | 20.0 | 4.4 | 2.0 | 20.0 | 20.0 |
| SR454 |  |  | 10.0 |  |  |  |  |  |  |  |  |
| SR440 |  |  |  |  | 20.0 |  |  |  | 18.0 |  |  |
| Beamset 770 |  |  |  | 10.0 |  |  |  |  |  |  |  |
| TPO | 12.0 | 12.0 | 12.0 | 12.0 | 12.0 | 12.0 | 12.0 | 12.0 | 12.0 | 1.8 | 18.0 |
| IRGACURE 184 |  |  |  |  |  |  |  |  |  | 10.2 |  |
| DETX | 0.1 | 0.1 | 0.1 | 0.1 | 0.1 | 0.1 | 0.1 | 0.1 | 0.1 | 0.1 | 0.1 |
| UV-22 | 1.0 | 1.0 | 1.0 | 1.0 | 1.0 | 1.0 | 1.0 | 1.0 | 1.0 | 1.0 | 1.0 |
| BYK-315 | 1.0 | 1.0 | 1.0 | 1.0 | 1.0 | 1.0 | 1.0 | 1.0 | 1.0 | 1.0 | 1.0 |
| Total | 100.0 | 100.0 | 100.0 | 100.0 | 100.0 | 100.0 | 100.0 | 100.0 | 100.0 | 100.0 | 100.0 |
| Mass of monofunctional monomer containing ether groups/Total mass of photopolymerizable component | 16.5% | 16.5% | 16.5% | 16.5% | 16.5% | 0.0% | 27.5% | 16.5% | 16.5% | 16.5% | 18.0% |
| Mass of monofunctional monomer containing a cyclic structure/Total mass of photopolymerizable component | 49.8% | 63.5% | 63.5% | 36.0% | 22.2% | 49.8% | 49.8% | 71.2% | 49.8% | 49.8% | 45.2% |
| Mass of multifunctional monomer/Total mass of photopolymerizable component | 27.5% | 13.8% | 13.8% | 27.5% | 27.5% | 27.5% | 27.5% | 6.1% | 2.8% | 27.5% | 30.0% |
| Mass of acyl phosphine oxide photopolymerization initiator/Total mass of photopolymerizable component | 16.5% | 16.5% | 16.5% | 16.5% | 16.5% | 16.5% | 16.5% | 16.5% | 16.5% | 2.5% | 27.0% |
| Viscosity (mPa · s, 25° C.) | 6.8 | 6.7 | 6.8 | 6.8 | 6.9 | 7.0 | 6.7 | 6.6 | 6.6 | 6.7 | 6.8 |
| LED curability (number of irradiations) | 1 | 1 | 1 | 1 | 1 | 2 | 1 | 1 | 1 | 3 | 1 |
| Adhesion | ○ | ○ | ○ | ○ | X | ○ | ○ | ○ | ○ | ○ | ○ |
| Solvent resistance | ○ | ○ | ○ | ○ | ○ | ○ | X | X | X | ○ | ○ |
| Scratch resistance | ○ | ○ | ○ | ○ | ○ | ○ | ○ | X | X | ○ | ○ |
| Discharge stability | ○ | ○ | ○ | Δ | ○ | ○ | ○ | ○ | ○ | ○ | ○ |
| Storage stability | ○ | ○ | ○ | X | ○ | ○ | ○ | ○ | ○ | ○ | X |
| LED curability in thin film form (number of irradiations) | 1 | 1 | 1 | 1 | 1 | 3 | 1 | 1 | 1 | 5 | 1 |

The results shown in Table 1 indicate that, according to the photocurable white ink compositions for inkjet printing in Examples 1 to 3, which conform to the present invention, excellent LED curability, adhesion, solvent resistance, scratch resistance, discharge stability, storage stability, and LED curability in thin film form can be achieved.

According to Comparative Example 1 where the white ink composition contained vinyl formamide, however, storage stability was inferior. Also, according to Comparative Example 3 where the white ink composition did not contain any monofunctional monomer containing an ether group, LED curability, including LED curability in thin film form, was inferior; whereas, according to Comparative Example 4 where such monomer was contained excessively, solvent resistance was inferior. According to Comparative Example 2 where the content of the monofunctional monomer containing a cyclic structure was low, adhesion was inferior; whereas, according to Comparative Example 5 where such monomer was contained excessively, solvent resistance and scratch resistance were inferior. According to Comparative Example 6 where the content of the multifunctional monomer was low, solvent resistance and scratch resistance were inferior. According to Comparative Example 7 where the content of the acyl phosphine oxide photopolymerization initiator was low, LED curability, including LED curability in thin film form, was inferior; whereas, according to Comparative Example 8 where such polymerization initiator was contained excessively, storage stability was inferior.

These results show that the present invention can demonstrate excellent LED curability, adhesion, solvent resistance, scratch resistance, discharge stability, storage stability, and LED curability in thin film form, by using a photocurable white ink composition for inkjet printing made with a specific composition.

What is claimed is:

1. A photocurable white ink composition for inkjet printing that contains: a photopolymerizable compound that contains: virtually no vinyl formamide; 0.1 to 20 percent by mass of a monofunctional monomer containing an ether group relative to the total mass of the photopolymerizable component; 35 to 70 percent by mass of a monofunctional monomer containing a cyclic structure relative to the total mass of the photopolymerizable component; and 5 to 40 percent by mass of a multifunctional monomer relative to the total mass of the photopolymerizable component; an acyl phosphine oxide photopolymerization initiator by 3 to 20 percent by mass relative to the total mass of the photopolymerizable component; and titanium dioxide; wherein the viscosity of said photocurable white ink composition for inkjet printing is 100 mPa·s or less at 25° C., wherein the monofunctional monomer containing an ether group is at least one type of compound selected from tetrahydrofurfuryl acrylate, phenoxy ethyl acrylate, ethylene oxide modified phenol acrylate, ethyl carbitol acrylate, and 2-methoxy ethyl acrylate; the monofunctional monomer containing a cyclic structure is at least one type of compound selected from benzyl acrylate, cyclohexyl acrylate, phenoxy ethyl acrylate, ethylene oxide modified phenol acrylate, acryloyl morpholine, isobornyl acrylate, tetrahydrofurfuryl acrylate, and 4-tert-butylcyclohexyl acrylate; and the multifunctional monomer is at least one type of compound selected from 1,6-hexane diol di(meth)acrylate, propoxylated neopentyl glycol di(meth)acrylate, dipropylene glycol di(meth)acrylate, and tripropylene glycol di(meth)acrylate.

2. An inkjet printing method using a photocurable white ink composition for inkjet printing according to claim 1, wherein said inkjet printing method is characterized in that: the photocurable white ink composition for inkjet printing is deposited on a target recording medium; and ultraviolet light generated by a light source using light-emitting diodes and having a luminescence peak wavelength in a range of 350 to 420 nm is irradiated onto the deposited photocurable white ink composition for inkjet printing.

* * * * *